INVENTOR
*Charles Allen*
BY
*Chas. C. Townsend*
ATTORNEY

C. ALLEN.
SETTLING AND THICKENING DEVICE.
APPLICATION FILED MAY 4, 1920.
1,408,154.
Patented Feb. 28, 1922.
2 SHEETS—SHEET 2.
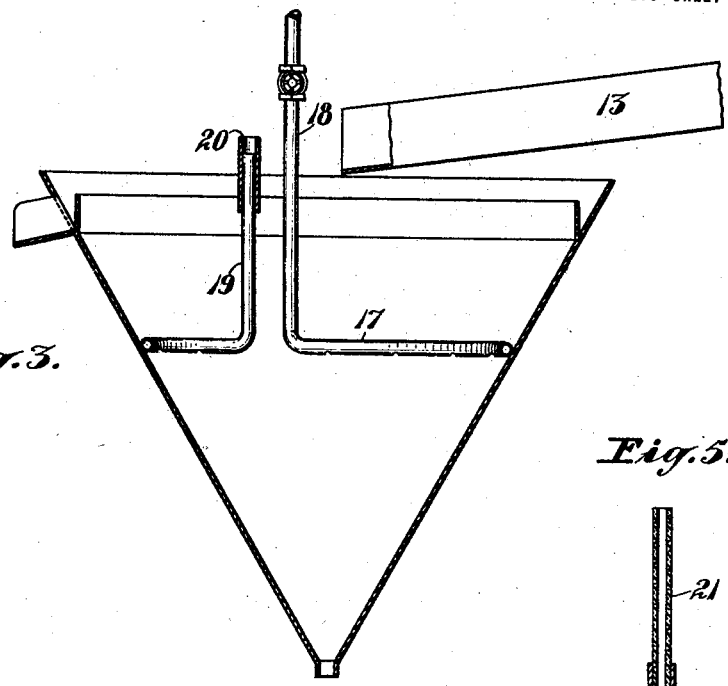
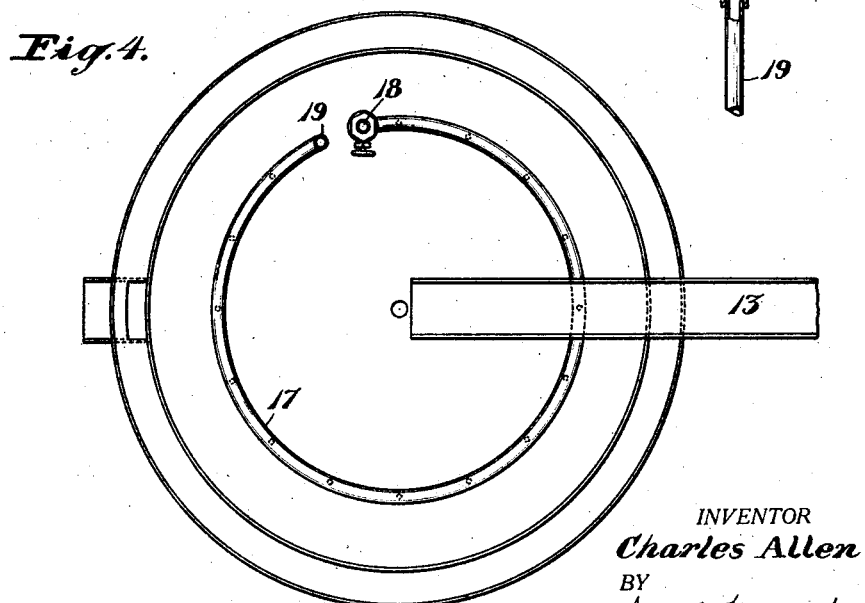
INVENTOR
Charles Allen
BY
Chas. C. Townsend
ATTORNEY

UNITED STATES PATENT OFFICE.

CHARLES ALLEN, OF EL PASO, TEXAS.

SETTLING AND THICKENING DEVICE.

1,408,154.  Specification of Letters Patent.  Patented Feb. 28, 1922.

Application filed May 4, 1920. Serial No. 378,864.

*To all whom it may concern:*

Be it known that I, CHARLES ALLEN, a citizen of the United States, residing at El Paso, in the county of El Paso and State of Texas, have invented a new and useful Improvement in Settling and Thickening Devices, of which the following is a specification.

This invention relates to settling and thickening devices, and has for its object to prevent the formation of agglomerated masses within the container that tend to interfere with the uniform downward movement of the particles. If these formations be not prevented, they frequently adhere to the side of the container and interfere seriously with the operation of the device.

Up to a certain limit, the plasticity of masses of solid particles and water increases as the proportion of water decreases, and if means be provided whereby the solids are prevented from agglomerating, and thereby exuding water, then the formation of aggregations that have insufficient fluidity to flow freely will be avoided. I have found by the use of the present device in regular mill work that the admission of water into those parts of the container in which aggregations tend to form will prevent such formations.

Figure 1:
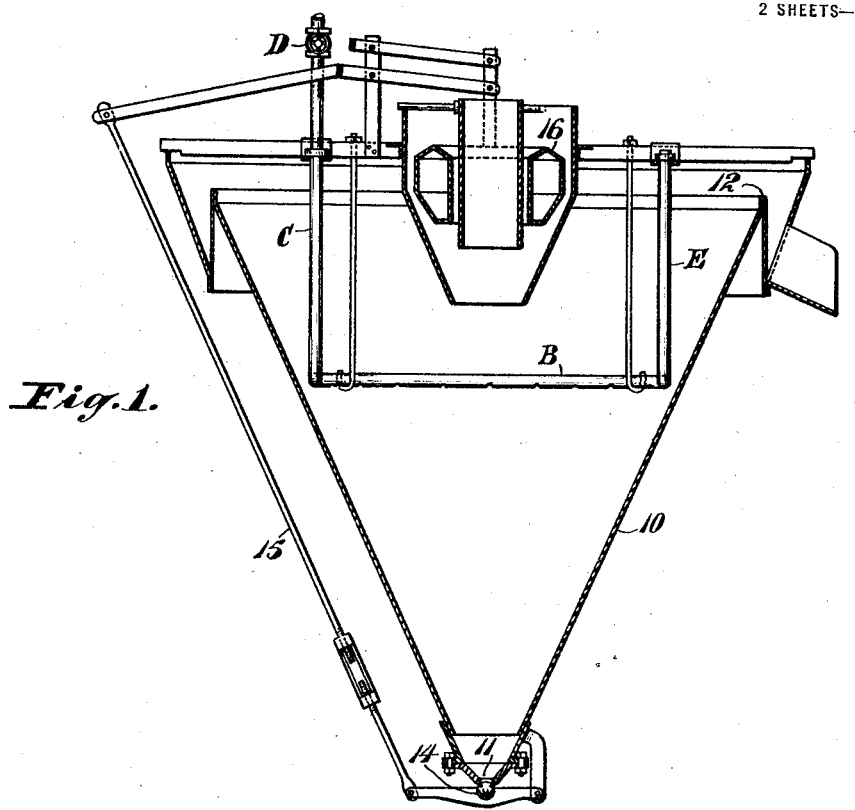
Figure 2:
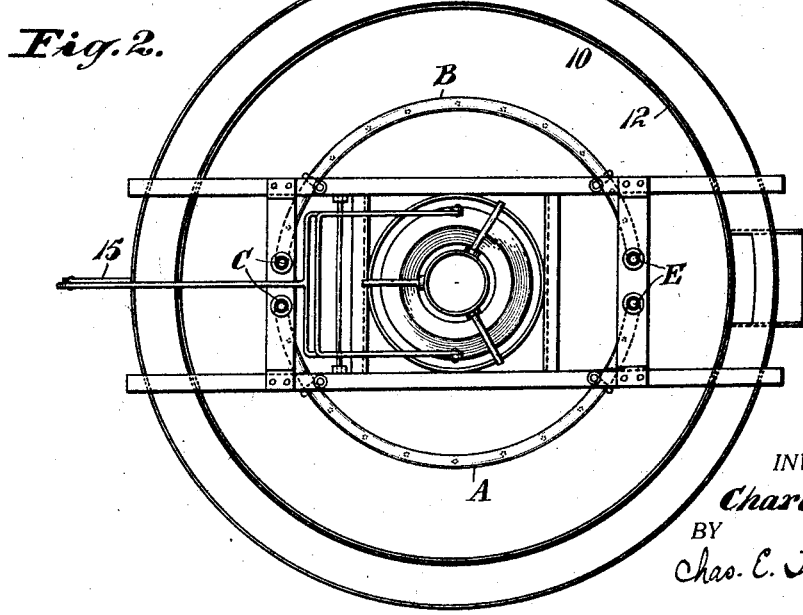

In the accompanying drawings,

Fig. 1 shows a vertical central sectional view of a thickener or settler embodying my invention Fig. 2 shows a plan view of the same Fig. 3 shows a vertical central sectional view of a modified arrangement of the present invention Fig. 4 shows a plan view of the device shown in Fig. 3

Fig. 5 shows a detail illustrating a modification wherein a glass tube has been added to the open-ended stand-pipe The settler or thickener shown herein comprises a container 10 in the form of an inverted cone having a discharge orifice 11 at the bottom and provided with an overflow rim 12 at the top. A launder 13 supplies the feed stream to the container.

The bottom discharge orifice 11 is controlled by means of a valve 14 which valve is actuated automatically by means of connections 15 with a float 16.

The feed stream of water and solids is discharged from the launder 13 into the container. The heavier and more quickly settling solids move downwardly to the bottom of the container and the lighter and more slowly settling particles overflow the rim 12. The heavier granular particles nearly always gravitate to and are discharged through the orifice 11 and the lighter particles tend to adhere to the sides of the container and to form coherent masses that interfere with regular settling in all parts of the container. Such coherent masses frequently sink to the bottom discharge orifice in detached pieces, thereby rendering the discharge through the orifice 11 irregular both in consistency and volume and even sometimes choking the orifice.

These coherent masses tend to form in that part of the settler or thickener in which the finer solid particles segregate and such segregation is due to the difference in the falling velocity of the solid particles in the feed stream. The heavier particles fall approximately vertically from their point of entrance. The lighter the particles, the greater the tangent of their fall, this being the effect of the velocity of the flow of the feed stream water toward the overflow lip.

Settlement of the segregated particles causes water to exude until the mass becomes plastic and frequently until it becomes compact and hard. These masses will not form as long as the moisture content is such that the solid particles are free to move among themselves. In order to supply water in that part of the settler or thickener in which plastic or compact masses would otherwise form, I use a perforated pipe which, as will be seen in Figs. 1 and 2. is made up in two semi-circular sections A and B, each section being complete in itself and having a supply pipe C extending from a point above the container downwardly within the contents thereof. This supply pipe is provided with a valve D to control the admission of water. At the opposite end of each section A and B, is a stand-pipe E extending upwardly within the container to a point above the level of the contents thereof.

In the form shown in Figs. 3 and 4, I employ a ring-shaped perforated pipe 17, communicating with one end of which is a valved supply pipe 18 and at the other end is a stand-pipe 19 extending up above the normal level of the contents of the tank. Preferably, I arrange a telescoping sleeve 20 on the upper end of the stand-pipe 19 so that the length thereof may be adjusted whereby to vary the velocity head to the flow of water through the pipe. As shown in Fig. 5, I may arrange a glass tube 21 on the upper end of the stand-pipe for the purpose of disclosing any deviation from the normal water level.

I have found from the operation of this device in mills, that the best results are obtained when the volume of water admitted to the perforated pipe does not much exceed the minimum quantity necessary to accomplish the object, and that means should be provided to maintain the proper volume of flow and that any change in the volume of water issuing from the orifices due to their choking or from any other causes should be instantly perceptible. For the practical continuance and operation of the device, means must also be provided whereby any sediment that may collect in the pipe may be washed out without creating a suction that would draw solids from the settler or thickener through the orifices into the pipe.

All of the above stated results are obtained by the use of the devices herein shown. The stand-pipe is open at its upper end and the distance that it projects above the surface of the contents of the tank determines the maximum velocity head to the flow through the orifices in the perforated pipe. The sleeve 20 on the stand-pipe provides means by which the velocity head can be adjusted. If the distance of the open-end of the stand-pipe above the contents of the tank be such that when the device is in normal operation, the water is just perceptibly overflowing, then if the overflow ceases, the volume entering through the supply pipe has decreased, whereas if the volume overflowing increases, either the volume of water entering the perforated pipe has increased or else the perforations in the pipe are more or less choked. If the latter condition is found to prevail, the valve D is opened sufficiently to wash any sediment in the perforated pipe out through the open-end of the stand-pipe. It is evident that during the washing out, the velocity of issuance of the water through the perforations in the pipe is increased. Hence, no solids will be sucked into the pipe through these orifices at this time.

With the water entering at one end of a perforated pipe, and an overflow stand-pipe at the opposite end, there is produced a practically uniform velocity of issuance from the perforations in the pipe. On the other hand, if the stand-pipe were omitted, and the perforated pipe be open-ended, there would be a hydraulic grade effect to the issuance. That is to say, the velocity of issuance from the orifices would diminish as the distance from the feed pipe increases. The best results are obtained when the water issues with just sufficient velocity to accomplish the desired object.

Various changes in the construction and arrangement of the several parts may be employed without departing from the spirit of my invention as disclosed in the appended claims.

Having thus described my invention, what I claim and desire to secure by Letters Patent is:

1. In a gravity separator or thickener, the combination with an inverted conical vessel having a discharge orifice at its bottom for quickly settling and heavy particles, said vessel being open at its top and arranged to allow the lighter and more slowly settling particles to overflow the rim thereof, and means for introducing material to be treated at the top of the vessel, of means to prevent the formation of plastic masses above the bottom discharge orifice, said means comprising a perforated pipe located in that portion of the vessel where the masses tend to form, valve-controlled means for supplying water to said pipe, and means other than said valve-controlled means for maintaining a uniform velocity of issuance of water through the perforations in the pipe.

2. The combination set forth in claim 1, including means for adjusting the velocity head to flow through the perforations.

3. In a gravity separator or thickener, the combination with an inverted conical vessel having a discharge orifice at its bottom for quickly settling heavy particles, said vessel being open at its top and arranged to allow the lighter and more slowly settling particles to overflow the rim thereof, and means for introducing material to be treated at the top of the vessel, of means to prevent the formation of plastic masses above the bottom discharge orifice, said means comprising a perforated pipe disposed horizontally in the vessel, a valve controlled supply pipe communicating with one end thereof, and a stand pipe at the opposite end extending to a point above the contents of the vessel and open at its upper end.

4. The combination set forth in claim 3, including a sleeve adjustably received on the open end of the standpipe whereby to vary the velocity head to the flow of water through the perforations in the pipe.

5. In a gravity separator or thickener, the combination with an inverted conical vessel having a discharge orifice at its bottom for quickly settling and heavy particles, said vessel being open at its top and arranged to allow the lighter and more slowly settling particles to overflow the rim thereof, and means for introducing material to be treated at the top of the vessel, of means to prevent the formation of plastic masses above the bottom discharge orifice, said means comprising a ring-shaped pipe having perforations in its walls and disposed horizontally in the vessel in the region where the masses tend to form, a valve controlled pipe to supply water to said ring-shaped pipe, and an open-ended standpipe communicating with the ring-shaped pipe and extending upwardly within the vessel to a point above the contents thereof.

In testimony whereof I have hereunto set my hand in the presence of two subscribing witnesses.

CHARLES ALLEN.

Witnesses:
 ARTHUR H. SWETT,
 T. S. MUNSON.